United States Patent
Kirk et al.

(10) Patent No.: US 11,265,534 B2
(45) Date of Patent: Mar. 1, 2022

(54) ENVIRONMENT-DEPENDENT ACTIVE ILLUMINATION FOR STEREO MATCHING

(71) Applicant: Microsoft Technology Licensing, LLC, Redmond, WA (US)

(72) Inventors: Adam G. Kirk, Renton, WA (US); Christoph Rhemann, Cambridge (GB); Oliver A. Whyte, Cambridge, MA (US); Shahram Izadi, Cambridge (GB); Sing Bing Kang, Redmond, WA (US); Andreas Georgiou, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/176,064

(22) Filed: Feb. 8, 2014

(65) Prior Publication Data
US 2015/0229915 A1    Aug. 13, 2015

(51) Int. Cl.
| H04N 13/363 | (2018.01) |
| G01B 11/16  | (2006.01) |
| H04N 5/33   | (2006.01) |
| H04N 9/31   | (2006.01) |

(52) U.S. Cl.
CPC ......... H04N 13/363 (2018.05); G01B 11/167 (2013.01); H04N 5/33 (2013.01); H04N 9/3179 (2013.01)

(58) Field of Classification Search
CPC .... H04N 13/0011; H04N 5/33; H04N 13/363; H04N 9/3179; G01B 11/2513; G01B 11/167
USPC .......................................................... 348/47
See application file for complete search history.

(56) References Cited

U.S. PATENT DOCUMENTS

| 6,381,026    | B1  |   | 4/2002 | Schiff et al. |             |
| 9,137,511    | B1  | * | 9/2015 | LeGrand, III  | G06T 19/006 |
| 2008/0043205 | A1  | * | 2/2008 | Lonn          | H04N 9/3173 |
|              |     |   |        |               | 353/69      |
| 2010/0149315 | A1  | * | 6/2010 | Qu            | A61B 1/00193|
|              |     |   |        |               | 348/46      |

(Continued)

FOREIGN PATENT DOCUMENTS

| CN | 1558828 A   | 12/2004 |
| CN | 101894502 A | 11/2010 |

(Continued)

OTHER PUBLICATIONS

"Second Written Opinion Issued in PCT Patent Application No. PCT/US2015/014023", dated Dec. 15, 2015, 6 Pages.
"International Search Report & Written Opinion Issued in PCT Application No. PCT/US2015/014023", dated May 4, 2015, 11 Pages.
"International Preliminary Report on Patentability Issued in PCT Application No. PCT/US2015/014023", dated May 2, 2016, 7 Pages.

(Continued)

*Primary Examiner* — Tung T Vo (57) ABSTRACT

The subject disclosure is directed towards controlling the intensity of illumination of a scene or part of a scene, including to conserve illumination power. Quality of depth data in stereo images may be measured with different illumination states; environmental conditions, such as ambient light, natural texture may affect the quality. The illumination intensity may be controllably varied to obtain sufficient quality while conserving power. The control may be directed to one or more regions of interest corresponding to an entire scene or part of a scene.

20 Claims, 8 Drawing Sheets

(56) References Cited

U.S. PATENT DOCUMENTS

| | | |
|---|---|---|
| 2010/0295839 A1 | 11/2010 | Nagaya et al. |
| 2011/0025827 A1* | 2/2011 | Shpunt .................. G06T 7/0057 348/47 |
| 2011/0242283 A1* | 10/2011 | Tyagi .................. G01B 11/2545 348/46 |
| 2012/0039525 A1 | 2/2012 | Tian et al. |
| 2012/0056982 A1 | 3/2012 | Katz et al. |
| 2012/0262553 A1* | 10/2012 | Chen .................. H04N 13/0011 348/47 |
| 2012/0294478 A1 | 11/2012 | Publicover et al. |
| 2013/0044187 A1* | 2/2013 | Hammes .............. H04N 5/2256 348/46 |
| 2013/0329015 A1 | 12/2013 | Pulli et al. |
| 2014/0037146 A1* | 2/2014 | Taguchi ............. G01B 11/2509 382/107 |
| 2014/0192158 A1* | 7/2014 | Whyte .................. G06K 9/6201 348/46 |
| 2014/0307047 A1* | 10/2014 | Kirk ........................ H04N 5/33 348/42 |
| 2014/0307055 A1* | 10/2014 | Kang ....................... H04N 5/33 348/47 |
| 2014/0307058 A1* | 10/2014 | Kirk ........................ H04N 5/33 348/47 |
| 2014/0320605 A1* | 10/2014 | Johnson ............. G01B 11/2513 348/47 |
| 2014/0380115 A1* | 12/2014 | Bar-On .................. H04B 10/80 714/758 |
| 2015/0092019 A1* | 4/2015 | Asano .................... G01C 3/085 348/46 |
| 2015/0154035 A1* | 6/2015 | Zepeniuk ................ G06F 3/038 715/762 |

FOREIGN PATENT DOCUMENTS

| | | |
|---|---|---|
| CN | 101949721 A | 1/2011 |
| CN | 102374996 A | 3/2012 |
| CN | 103517057 A | 1/2014 |
| CN | 103748598 A | 4/2014 |
| JP | 2007265120 A | 10/2007 |
| WO | 2014002415 A1 | 1/2014 |
| WO | 2014/020604 A1 | 2/2014 |

OTHER PUBLICATIONS

"Office Action Issued in European Patent Application No. 15708623.2", dated Jan. 26, 2018, 7 Pages.

"Office Action Issued in European Patent Application No. 15708623.2", dated May 24, 2018, 5 Pages.

"Office Action Issued in Chinese Patent Application No. 201580007576.3", dated Jun. 13, 2018, 11 Pages. (without Translation).

"Office Action Issued in Chinese Application No. 201580007576.3", dated Mar. 7, 2019, 14 Pages.

"Office Action Issued in European Patent Application No. 15708623.2", dated Jan. 29, 2018, 6 Pages.

"Third Office Action Issued in Chinese Patent Application No. 201580007576.3", dated Jul. 26, 2019, 27 Pages.

"Office Action Issued in Chinese Patent Application No. 201580007576.3", dated Jan. 19, 2020, 9 Pages.

"Fourth Office Action and Search Report Issued in Chinese Patent Application No. 201580007576.3", dated May 20, 2020, 8 Pages.

* cited by examiner

ENVIRONMENT-DEPENDENT ACTIVE ILLUMINATION FOR STEREO MATCHING

BACKGROUND

A relatively well-known technique to perform depth estimation of objects in a scene is to process captured stereo images (perform stereo matching) to look for disparities between the images that relate to objects' distances. To facilitate stereo matching, one known approach is to actively illuminate the scene with patterned illumination (e.g., a pseudorandom pattern of laser dots). This generally provides distinctive texture virtually everywhere in the images, making it easier to find correspondences between the stereo images that are processed for depth estimation. The projected pattern and the stereo cameras may operate in the infrared (IR) part of the spectrum so as to be invisible to humans, or they may operate in the visible part of the spectrum.

However, operating a laser or other light source for active illumination significantly increases the power consumption of a device. Thus, using active illumination for stereo matching can drain the battery of a battery-powered device relatively quickly (or alternatively waste energy on a plugged-in device).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards a controller coupled to a projector set (comprising one or more projection elements) that projects a light pattern towards a scene and is controlled based upon data corresponding to environmental conditions.

The controller may be configured to turn off and turn on at least one of the one or more projection elements and/or ramp power up and/or down, to at least one of the one or more projection elements.

One or more aspects are directed towards determining depth data based upon stereo images that are dependent at least in part upon illumination of a scene, including obtaining quality data based upon stereo matching of images, and controllably projecting light into the scene based upon the quality data. The illuminating of the scene may be coordinated with the capture of the stereo images.

Other aspects may be directed towards illuminating a region of interest comprising a scene or part of a scene, and processing captured stereo image data to determine an intensity level for illuminating the region of interest.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards controlling the illumination power that is emitted from an active illumination source, to attempt to provide sufficient pattern texture quality for stereo matching (to a desirable confidence level) while reducing the overall power consumption. In this way, the power that is used generally may be less than the maximum at times when using the maximum power is not beneficial.

For example, in some environments, the patterned illumination may not be particularly useful in providing texture, in which case the power used to illuminate the light source is wasted. Examples of such environments may be when a scene (or a region of interest therein) contains sufficient natural texture such that the projected illumination is not necessary to obtain good stereo matches, or when ambient illumination is so bright that the projected illumination is not distinguishable (e.g., the pattern is washed out).

In one aspect, the decision with respect to setting the amount of active illumination may be based on processing captured images to determine the quality of stereo matching, whereby no additional hardware is needed to measure the environment's effects on the images. For example, the amount of texture in images may be analyzed to turn on an illuminator if there is insufficient natural texture to provide desired quality, or turn off the illuminator if sufficient natural texture is present. In other words, the results of stereo matching using previously captured images may be analyzed to turn on an illuminator if the stereo matches are poor or ambiguous (e.g., low in confidence/quality), for example, or vice-versa.

In one or more various aspects, the illumination source may be ramped up or ramped down (e.g., between zero and some maximum power level) rather than turned on or off in a binary state. In other aspects, a set of illuminators, such as an array of laser diodes or the like arranged together to provide the projection pattern, may have individual lasers or subsets thereof selectively turned on or off (or ramped up or down) to illuminate only certain parts of a scene to a desired level, e.g., regions of interest and/or those regions where more illumination is deemed needed.

Other examples of deciding whether to enable the illumination include filtering the images such that the contribution of the active illumination is removed (e.g., using a sequence of morphological filters, or a median filter). The image processing may analyze the remaining image, and if sufficient texture remains for stereo matching to succeed, turn off or ramp down the active illumination. Such filtering may be easier if the location, orientation and pattern of the active illuminator is known with respect to the stereo cameras, so that the correspondence between pixels in the stereo images and locations in the known pattern can be obtained.

Alternatively, the illuminator may be turned on or off periodically or on some other schedule or event, to see if there is a significant improvement or degradation in the quality of the stereo matching. Based on this, the system may decide to keep the illuminator on or off. Similarly, ramping up or down of the illuminator may be controlled to attempt to reduce power consumption while maintaining sufficient stereo matching quality.

The image and depth stream may be ignored with the illuminator turned on/off (e.g., periodically) in order to achieve a higher peak power. For example, if the illumination is enabled only half the time, the average power consumption is halved while maintaining the same peak illumination intensity. If this time-varying illumination is synchronized with the stereo cameras, the system may ensure that the peak illumination occurs while the camera shutters are open (capturing light), and thus reduce the amount of light emitted while the camera shutters are closed. Similarly, illumination may be coordinated with rolling camera shutters so that generally only the region currently being captured is illuminated.

It should be understood that any of the examples herein are non-limiting. For example, the projected light pattern may use spots, generally exemplified herein as dots, but the dots may be of any shapes and/or sizes. Projected patterns may be pseudorandom, or evenly or otherwise distributed, and may be stationary, moving, and so forth. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in active depth sensing and light projection in general.

Figure 1:
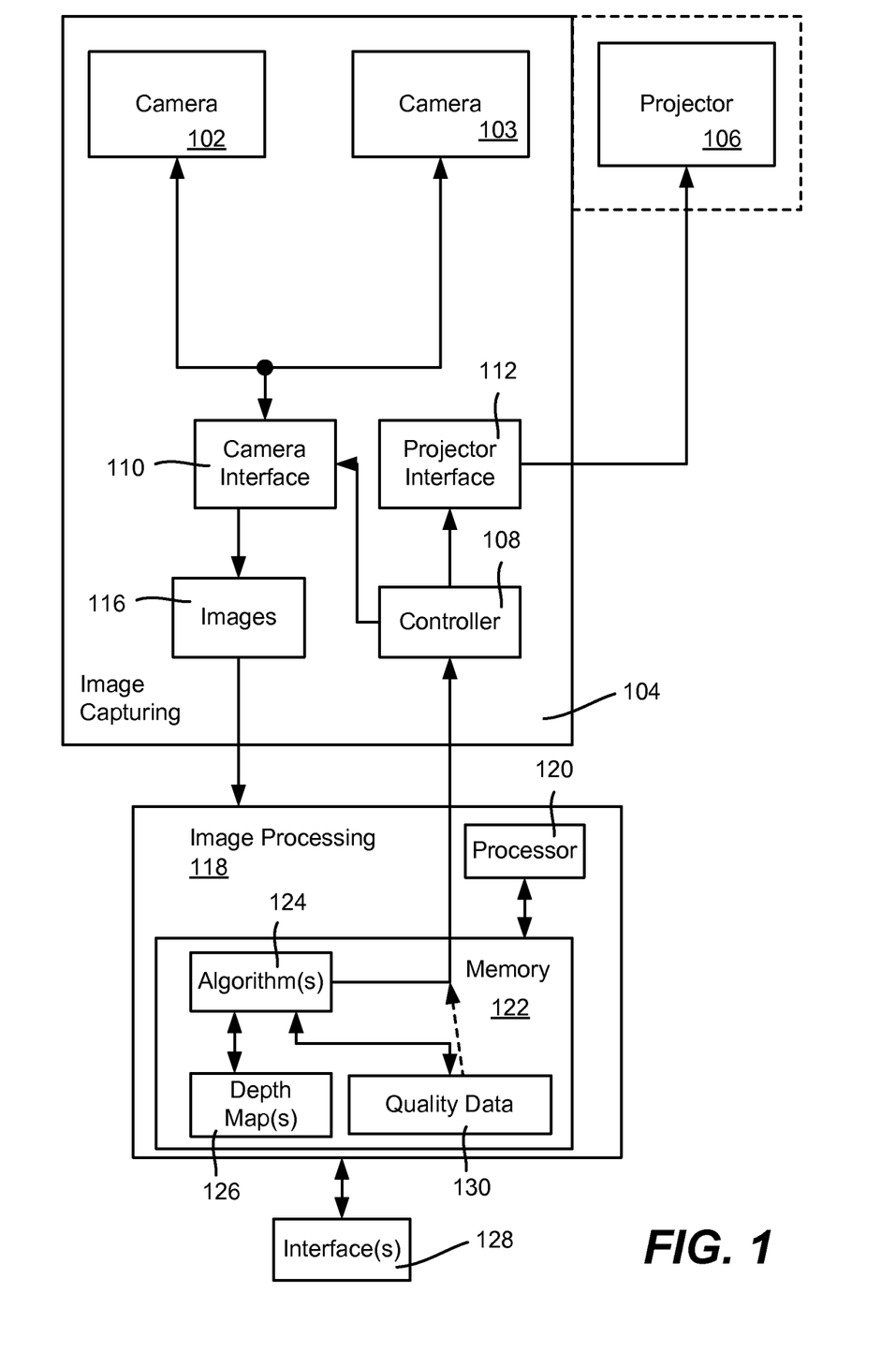
FIG. 1 is a block diagram representing example components that may be used to project and capture a light pattern and adapt projection power dependent on environmental conditions or the like, according to one or more example implementations.

FIG. 1 shows an example system in which stereo cameras 102 and 103 of an image capturing system or subsystem 104 capture images synchronized in time (e.g., the cameras are "genlocked"). The cameras may be stereo RGB or stereo IR cameras, or a combination thereof; for example, there may be stereo RGB and stereo IR cameras in a given implementation, a single RGB camera with stereo IR cameras, a single IR camera with stereo RGB cameras, and so on. In one implementation the cameras capture infrared (IR) images, as IR does not affect the visible appearance of the scene (which is often highly advantageous, such as in video conferencing and object modeling applications). As can be readily appreciated, in some scenarios such as studio environments, more than two depth-sensing cameras may be present. One or more other cameras may be present in a given system, such as RGB cameras, and such other cameras may be used to help correlate dot pairs in different stereo images, for example.

In FIG. 1, a projector set 106 comprising at least one projection element (e.g., laser/laser diode) is shown that projects an IR and/or RGB pattern onto a scene, such as a pattern of spots (e.g., dots) or a line pattern, although other spot shapes and/or pattern types may be used. For purposes of brevity, spots/dots are generally described hereinafter. By illuminating the scene with a relatively large number of distributed dots, (e.g., on the order of 100,000 dots for a scene), the cameras 102 and 103 capture texture data as part of the infrared image data, although as described herein, in certain scenarios texture data may be captured without illumination as described herein. The pattern may be designed (e.g., encoded) into a diffractive optical component (a diffractive optical element or combination of elements) that disperse laser light into the scene, e.g., as a dot pattern.

Thus, some examples of possible hardware configurations for the cameras include a pair of RGB cameras with a visible illumination pattern, a pair of IR cameras with an IR illumination pattern, a pair of cameras which can capture registered RGB and IR images simultaneously, such as by splitting the incoming light across two sensors with appropriate spectral responses, or by using a sensor with a four-color (R, G, B, IR) Bayer pattern. Such a sensor may be combined with a projector set/illuminator that is visible in either the RGB images, or the IR image, or both.

Another alternative is to perform stereo matching with a single camera plus a projector. This may be performed when the position, orientation and pattern of the projector is known, by matching dots in the captured camera image against dots in the known projector pattern. Thus, stereo matching, stereo image matching, stereo image data and so forth refer to using one or more captured images, including one image matched against known projector pattern data.

Figure 2:
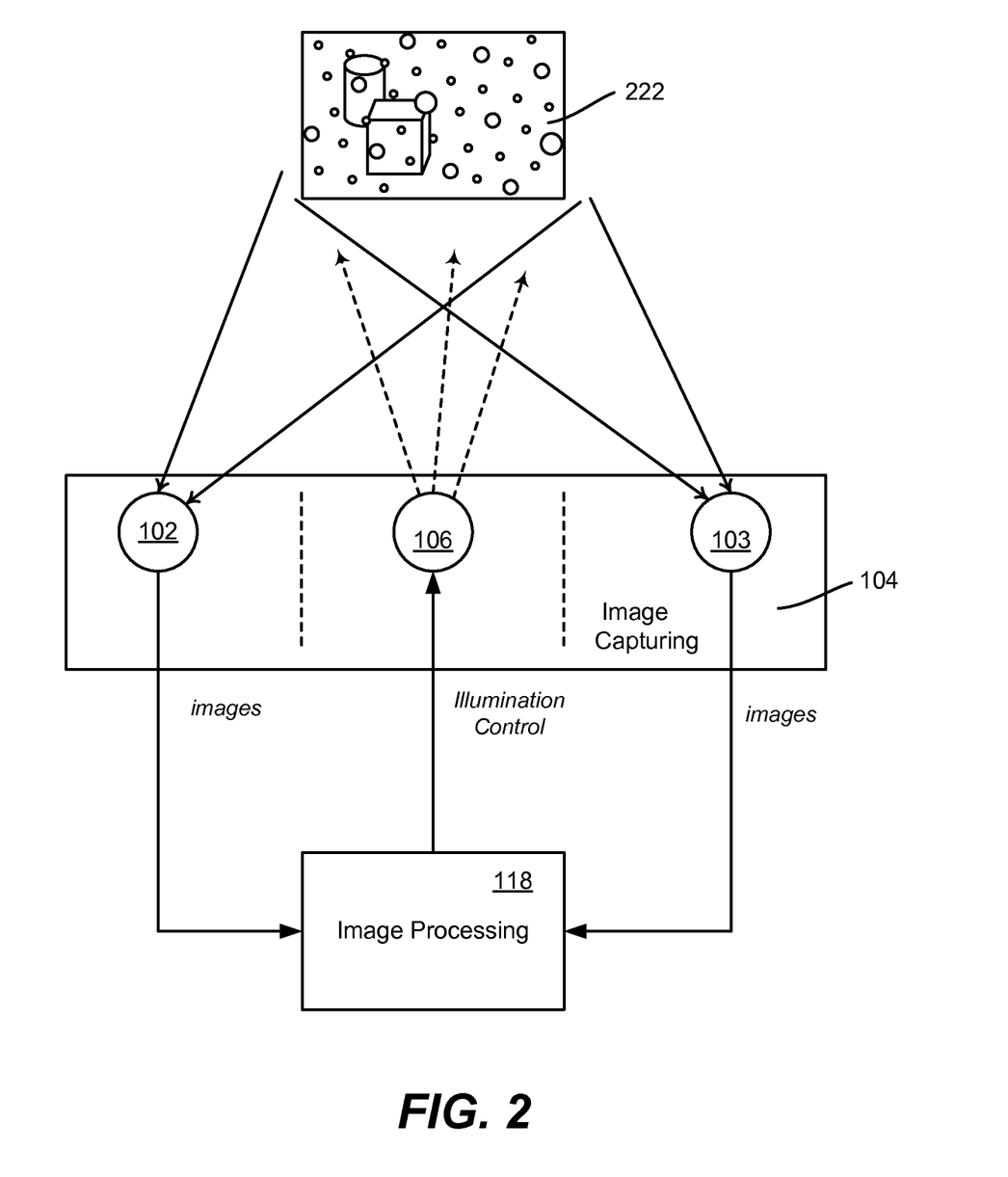
FIG. 2 is a representation of projecting structured light (dots) into a scene having with an illumination controlled projector, according to one or more example implementations.

FIG. 2 exemplifies the general pattern projection concept. The projector set 106, represented as a circle in between the stereo cameras 102 and 103, projects a dot pattern onto a scene 222. The cameras 102 and 103 capture the dots as they reflect off of object surfaces in the scene 222 and (possibly) the background. In general, one or more features of the captured dots including disparities between stereo images are indicative of the distance to the reflective surface. Note that FIG. 2 is not intended to be to scale, nor convey any sizes, distance, dot distribution pattern, dot density and so on, (nor are any of the drawings herein).

Note that the placement of the projector 106 may be outside the cameras (e.g., FIG. 1), or in between the cameras (FIG. 2) or at another location, such as above or below one or both of the cameras. There may be more than one projector at different locations. Further, there may be projectors that illuminate a scene without an active texture pattern, e.g., a broad spectrum IR and/or visible light source. The examples herein are in no way limiting of where the cameras and/or projector are located relative to one another, and similarly, the cameras may be positioned at different positions relative to each other.

As described herein, the illumination of the projector 106, which may comprise a single laser or multiple lasers (e.g., arranged in an array), may be controlled to save power, e.g., based upon the current image sensing environment. To this end, in one or more implementations, the example image capturing system or subsystem 104 includes a controller 108 that via a camera interface 110 controls the operation of the cameras 102 and 103; (the controller 108 alternatively may be part of the image processing system or subsystem 118). The exemplified controller 108 also controls the operation of the projector 106 via a projector interface 112; (although it is understood that separate camera and projector controllers may be present in alternative implementations). For example, the cameras 102 and 103 are synchronized (genlocked) to capture stereo images at the same time, such as by a controller signal (or different signals for each camera). The projector set 106 may be coordinated with the cameras, such as turned on or off, pulsed, changed in intensity (power) and/or otherwise have one or more parameters controllably varied, for example. As described herein, this results in controlling the projector power consumption in one or more various ways.

The images 116 captured by the cameras 102 and 103 are provided to an image processing system or subsystem 118. In some implementations, the image processing system 118 and image capturing system or subsystem 104, or parts thereof, may be combined into a single device. For example a home entertainment device may include all of the components shown in FIG. 1 (as well as others not shown). In other implementations, parts (or all) of the image capturing system or subsystem 104, such as the cameras and projector, may be a separate device that couples to a gaming console, personal computer, mobile device, dedicated processing device and/or the like. Indeed, a gaming console is exemplified in FIG. 8 as one environment that may be used for processing images into depth data.

The image processing system or subsystem 118 includes a processor 120 and a memory 122 containing one or more image processing algorithms 124. One or more depth maps 126 may be obtained via the algorithms 124 such as by extracting matching features (such as dots and/or lines). Also shown in FIG. 1 is an interface 128 to the image processing system or subsystem 118, such as for connecting a keyboard, game controller, display, pointing device microphone for speech commands and/or the like as appropriate for a user to interact with an application or the like that uses the depth map.

As is known, parts in the different images taken at the same time (e.g., with genlocked stereo cameras) may be correlated with one another, such as by matching small patches between images of the same scene captured at the same instant. Thus, with captured images, known algorithms can find matching patches between the images and determine individual depth-related features (depth maps) by matching projected light components (e.g., dots) in each image, using disparities of certain features between matched dots to determine depths. This is one way in which a depth map may be obtained via stereo image processing.

The information as to the confidence of how well patches in stereo images correlate may be measured, and/or the texture may be measured. This provides an indication as to the stereo matching quality, as represented in FIG. 1 via quality data 130. With respect to quality/confidence, any number of known techniques for determining how well patches correlate may be used, such as based on variance computations, and are thus not described herein. As can be readily appreciated, processing of captured images may be performed to determine the stereo matching quality, and thus separate/external hardware measurement devices need not be used, although the use of such separate hardware devices is feasible.

As described herein, one or more of the algorithms 124 (or the controller 108 itself as represented by the dashed line) may use the quality data 130 as feedback to the controller 108 with respect to illumination of the scene by the projector 106. For example, if stereo matching quality is low, the projector set 106 may be increased in intensity in an attempt to provide more texture and thus increase the stereo matching quality. Thus, in certain aspects, the intensity (ramp level and/or on-off state) of the projector 106 may be controlled to save power yet provide sufficient patch matching quality. In other aspects, selected projection elements such as lasers of an array that form the projector set 106 may be similarly controlled, such as to illuminate a particular region of interest or set of regions where quality is low.

By way of example, in some scenes, active illumination via the projected pattern provides sufficient patch correlation with respect to a desired quality level. However, full intensity of the laser or lasers during active illumination may not be needed to provide sufficient quality, and thus the intensity may be lowered without sacrificing acceptable depth estimation accuracy. As another example, as is understood, not all scenes or parts of scenes benefit from active illumination, or at least not much. Further, in a given scene the projected pattern may be washed out by ambient illumination, whereby illuminating such a scene with the projector set 106 only wastes power. In another scene, there may be sufficient natural texture such that active illumination does not make a significant quality difference with respect to depth determination, and thus the active illumination is not needed (or at least not at full power). Thus, active illumination is not always beneficial, at least not for all parts of a scene, and/or need not always be fully-powered.

A decision to illuminate may be based on a region of interest (ROI) in the images, instead of the entire image pairs of the scene; e.g., if a scenario is interested in estimating depth for hand-tracking, only the hands may be considered, and not the background, when deciding whether to enable/disable the active illumination.

For certain kinds of illuminators, the system may control the illumination in a spatially-variant way, such that some parts of the scene receive more light than others. For example, if the illumination is provided by two lasers, such that the left half of the scene is illuminated by one laser, and the right half by the other, the system can vary the power of the two lasers independently. Examples of illuminators offering this kind of control include Digital Light Projector (DLP), an array of lasers, or an array of vertical-external-cavity surface-emitting-lasers (VECSELs).

A system with a pair of RGB cameras and a pair of IR cameras may include two illumination sources, namely one visible in the RGB images, and one visible in the IR images. The two modes of illumination may be applied in differing amounts to different parts of the scene, depending on how effective they are at enabling stereo matching in those regions. For example, some materials may absorb IR light, but reflect visible light, and so the visible active illumination may be applied there.

If the patterned illumination is only visible in the RGB or IR images, but not both, one or more other techniques for deciding whether or not to enable the active illumination may be used. For example, the images without the pattern can be continuously analyzed, or analyzed on some sampling basis, to see if sufficient natural texture exists for stereo to succeed. The illumination can be enabled or disabled based on this analysis. When the illuminator is disabled, the system may use a combination of the RGB and IR images to perform the stereo matching. When the illuminator is enabled, the system may use only the images containing the pattern to perform the stereo, e.g., with an IR illuminator, the RGB images may be used to decide whether or not to enable the illuminator.

Another example is to use an additional (e.g., relatively inexpensive low-resolution) camera in combination with a (e.g., low-resolution) diffractive optical element to compute/ estimate the desired lighting conditions. The additional camera may record an image with a very short exposure shortly before the actual stereo image is captured; in this scenario, there are almost no motion artifacts and no lag.

Further, two (or more) diffractive optical elements may be used and selectively switched between as desired. For example, one diffractive optical element may have very few dots, but bright dots, whereby coarse depth sensing in high ambient light may be obtained. Another more dense/relatively high resolution diffractive optical element having lower power dots may be used when the environment is dark. The switching between two (or more) such patterns can be performed using a liquid crystal cell.

Another way of performing selective illumination is to turn off illumination in a first stage, capture images, and select regions that have high quality stereo matching as a first set. In a second stage, illumination is turned on, the images captured, and regions that have high quality stereo matching are selected as a second set. Then the system may combine (e.g., union or intersect) the two sets, keeping the best region or regions of each, for example. Note that the same may be done with RGB and/or IR—turn on RGB, turn on IR and combine.

Once the regions are known for each image, if a system is configured to selectively illuminate regions, then additional savings are possible. For example, instead of alternating between RGB and IR, those regions with good quality with IR illumination only need be illuminated with IR, while those regions with good quality with RGB illumination only need be illuminated with RGB. To compensate for motion in the images, alternating or simultaneous illumination of all regions, or those in which motion may be predicted as likely, may be used.

Figure 3:
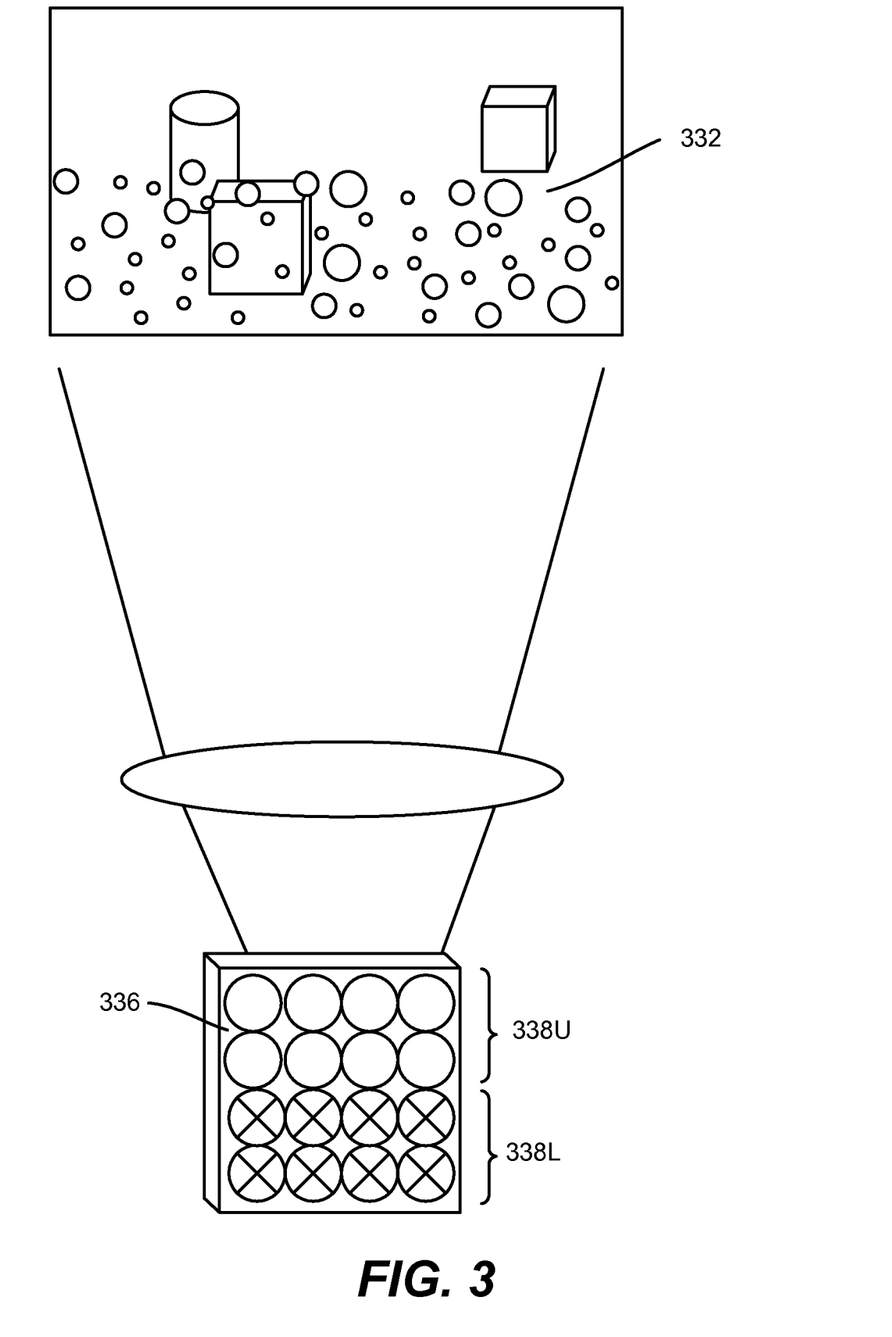
FIG. 3 is a representation of controlling a set of illuminators to project structured light onto only a selected part of a scene, according to one or more example implementations.

With respect to illuminating only certain regions-of-interest, FIG. 3 shows an example where dots are projected to actively illuminate approximately only the lower half of a scene 332. To this end, the projector 306 comprises an array of laser LEDs 338U and 338L (the circles therein), with only some of the LEDs powered up, that is, those circles marked with a cross "x" collectively labeled 338L.

For example, in one or more implementations, rolling shutter cameras scan the scene from top to bottom. If two (or more) lasers are used, a first laser/subset of lasers of the projector such as the subset 338U may illuminate the upper part of the scene when the cameras are imaging that top region, and a second laser/subset of lasers such as the subset 338L when the cameras are imaging the lower half. More granular illumination control in coordination with camera capturing regions may be used than that represented in the example of FIG. 3, e.g., smaller fractions than halves may be coordinated with the cameras' capturing locations. Note that in addition to saving power via selective illumination of only a subset of lasers at a time, other advantages in terms of the optical system and performance also may exist.

In other aspects, a liquid crystal shutter (such as similar to the ones used in active 3D glasses) may be used to black out the camera when the lasers are off. This reduces the ambient noise in the camera whereby less IR light may be needed. A liquid crystal shutter may be combined with a rolling shutter and corresponding selective region illumination (as exemplified above) to have a black out region that is opposite of where the laser illumination currently is taking place.

It is possible to create the full field of view of the IR illumination from an array of 3×3 identical patterns/tiles. The pattern/tile of the smaller field of view may be replicated using two separate binary gratings placed orthogonal to each other. For example, using a liquid crystal cell on top of each binary grating or any other technique, it is possible to control the power ratio to central order versus the two side orders. Thus, the intensity of the nine patches, subject to horizontal and vertical symmetry, can be controlled. This is particularly useful as the corners of the field of view are disadvantaged due to the optical characteristics of the system (reduced lens performance, smaller effective area of lens and so forth) but by a different extent depending on the environment parameters (distance, object reflectivity and ambient IR).

Dynamic focusing of the illuminator is another implementation. In general, sharp dots are easier to detect, whereby having well-focused dots at the most difficult parts of the scene effectively reduce the power of the laser.

A region of interest may change over time. By way of example, consider that a region of interest corresponds to a person 444, as in FIG. 4. It is thus desirable in the example of FIG. 4 to illuminate the person, with as little power as possible being used to illuminate rather than any other objects or the background 446.

Figure 4:
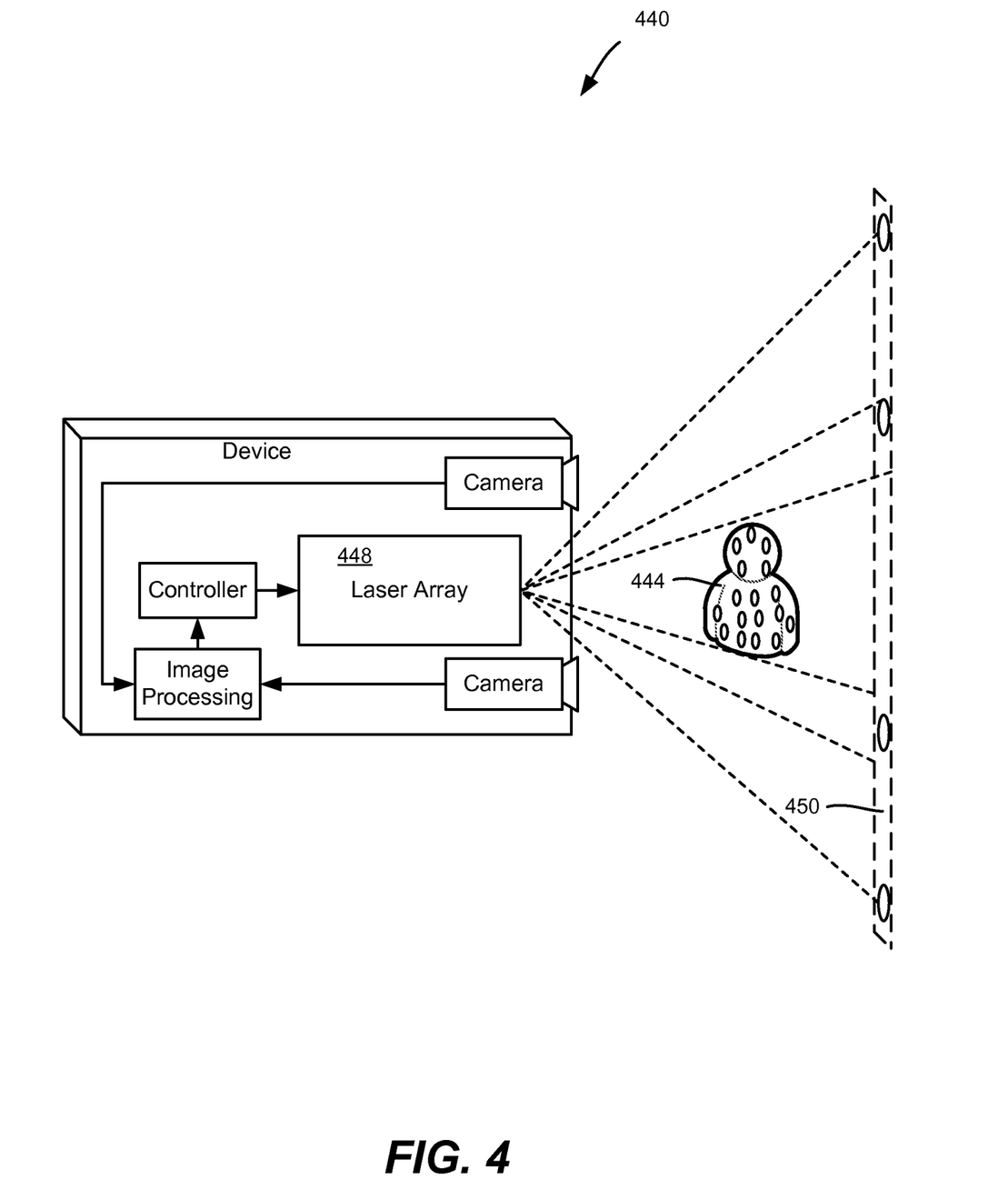
FIG. 4 is representation including a block diagram illustrating example components that may be used to control structured light projection to illuminate a subject, according to one or more example implementations.

A person may be tracked within a series of images for example, whereby the current approximate depth computed for the person 444 in an image may be used to select lasers of an array 448 that best illuminate that approximate depth, that is, selection may include the depth/z-direction. Further, the region may change as the person moves in any direction, including turning one way or another. Thus, in addition to z-coordinate considerations, the region of interest may vary in x and y coordinates over time.

Figure 5:
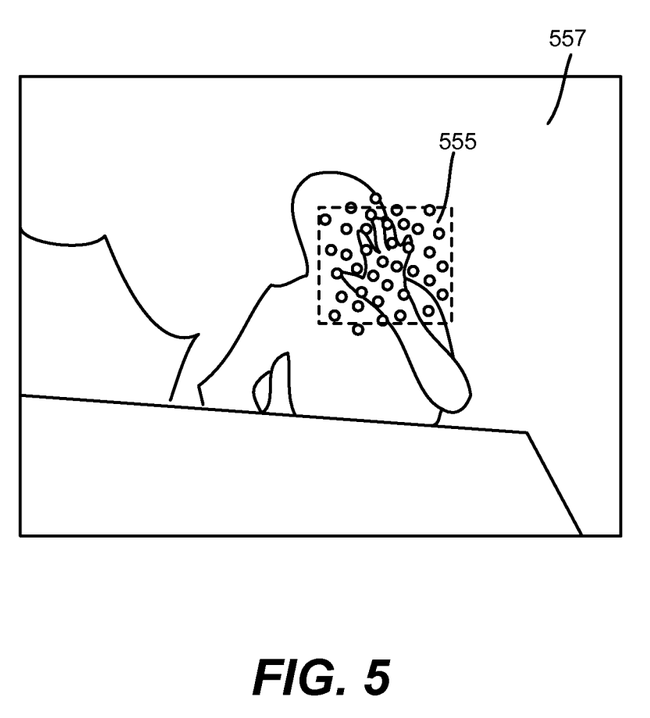
FIG. 5 is a front-view representation of controlling a set of illuminators to project structured light onto only a selected region of interest in a scene, according to one or more example implementations.

Similarly, if some part or parts of the person, such as the person's hands, comprise the desired illumination goal, the hands may be tracked as a region, with an appropriate region of interest illuminated around the hands. This is generally represented in FIG. 5, in which a region 555 (the dashed box) corresponding to a subject's hand in the scene 557 is approximately illuminated; (note that region-of-interest illumination need not be rectangular, nor may a given system be able to target such a relatively small region for illumination). Again, in addition to x and y coordinates for the hand position as it moves, the z-depth of the hands may be used in determining which subset, type or the like of lasers to energize.

Figure 6:
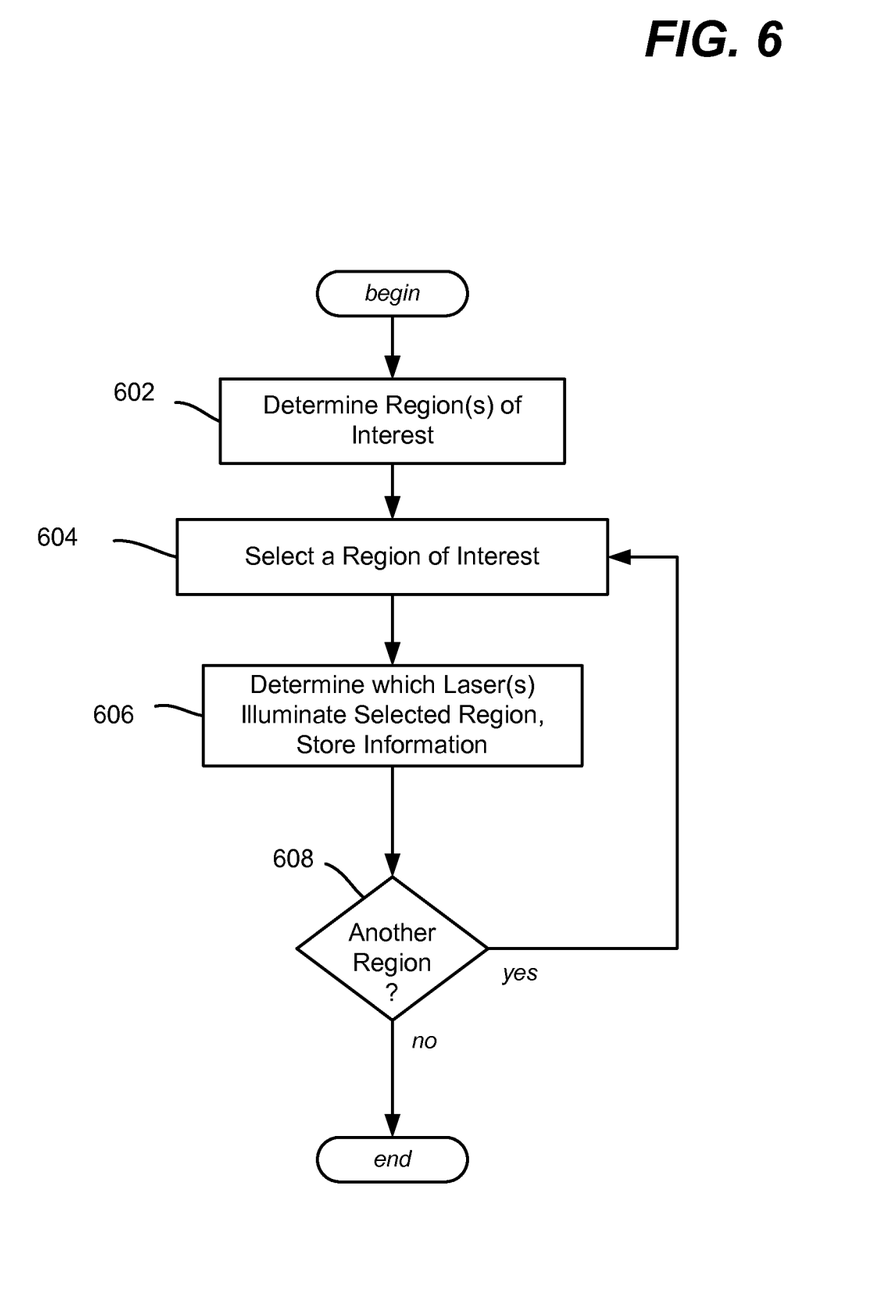
FIG. 6 is a flow diagram representing example steps that may be taken to determine a region (or regions) of interest for illumination, according to one or more example implementations.

FIG. 6 is a flow diagram showing example steps of a region of interest determination process, which may be used by systems having the ability to illuminate only selected regions as desired. In general, the regions of interest are determined based upon any suitable criteria or needs; e.g., in a videoconferencing scenario, a participant may be the target of a desired region, for sign language, the signer's hands may define the desired region, for a demonstration a product may define the desired region, and so on. The determination (e.g., at step 602) may be automatic (e.g., based on automatic face and/or skin detection, and/or motion), or manual to an extent, and/or selected for a scenario (e.g., show people, show an object being demonstrated, show a person's hands, and so on). In the context of videoconferencing, audio may also be used to aid localizing the speaker, and hence region of interest.

Step 604 selects a region of interest from possibly several regions of interest that may exist in a scene. For example, a person speaking about a product may be one region, while the product may be in another region. Note that an entire scene may be considered the (single) region of interest.

For the selected region, step 606 represents determining which projection elements (e.g., laser or lasers) correspond to that region. Note that this may be part of a static setup routine, and/or may be dynamic as the region moves or otherwise changes (such as in the amount of ambient light hitting that region), for example. The projection elements that correspond to a selected region may be based upon two-dimensional or three-dimensional coordinates as described above. Other parameters, such as an initial amount of illumination power may be determined as well, as may choices such as IR or RGB (or both), illumination rate versus frame rate, and so on. Any of the variable data may be stored in association with the region to receive the controlled illumination as described herein.

Step 608 repeats the process for any other region or regions of interest. As can be readily appreciated, the steps of FIG. 6 may be repeated as needed for any or all regions, such as if the region is moving. For example, if a person is the region of interest, FIG. 6 may be repeated as the person moves to determine which lasers to energize to keep the person illuminated.

Figure 7:
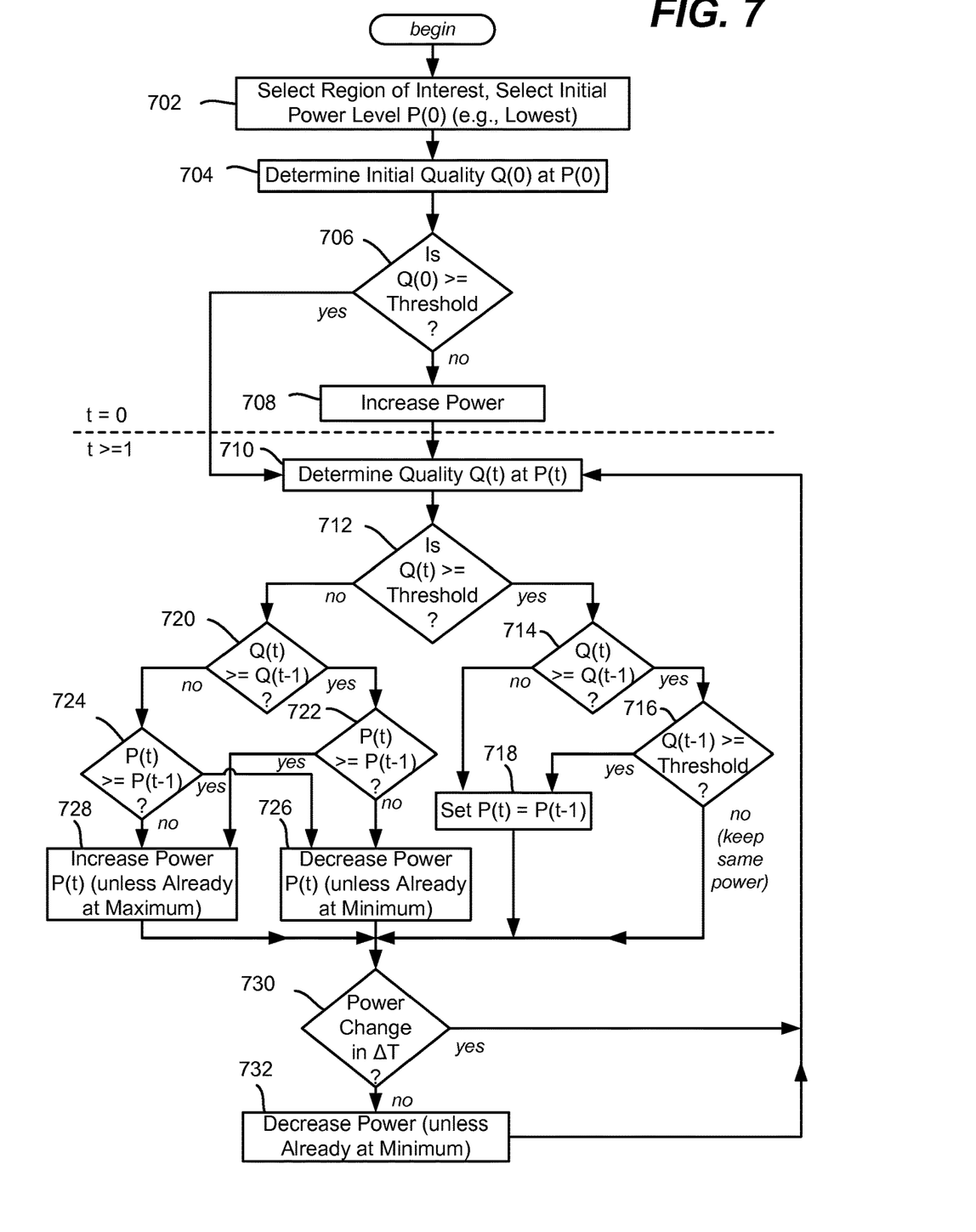
FIG. 7 is a flow diagram representing example steps that may be taken to control illumination of one or more regions of interest based on quality feedback, according to one or more example implementations.

FIG. 7 summarizes various aspects of controlled illumination in one or more example implementations in the form of example steps of a flow diagram. In FIG. 7, illumination intensity (corresponding to power) is variable and may be directed to any region of interest, although as will be understood, the steps of FIG. 7 also work with a binary on/off laser operation and/or with a single region of interest, including the entire scene as one region, even if illuminated with a single projection element.

Step 702 selects a region of interest, and starts with initial (e.g., lowest) illumination power P(0), such that P(0) yields an initial quality measure, Q(0), at step 704. At step 706, if the initial quality measure Q(0) equals or exceeds a threshold quality value, no change to power is performed. Conversely if the initial quality measure Q(0) is below the threshold value, the power is increased at step 708.

This yields a new power, quality measurement at time t=1, that is, P(1), Q(1) is the current power, quality relationship as determined at step 710. Steps 710 and beyond also apply for times greater than t=1.

Step 712 evaluates the current quality measure at any given time relative to the threshold quality value. If the current quality measurement Q(t) is at or above quality threshold value, step 712 branches to step 714 where the current quality measurement Q(t) is evaluated against the previous quality measurement Q(t−1). If at or above the previous quality measurement, step 714 branches to step 716 where the previous quality measurement Q(t−1) is evaluated against the quality threshold, and, if not at or above quality threshold, the same power level is maintained. Otherwise the power level is restored to the previous power level via step 718. In sum, if the current quality measurement exceeds the threshold (step 712), and further is improved over the previous quality measure (step 714), the power is unchanged if the previous quality measure also exceeded the threshold quality value (716). Otherwise the power may change via step 718.

Returning to step 712, if the current quality measurement Q(t) is below the threshold quality value, step 720 is performed to evaluate the current quality measurement Q(t) against the previous quality measurement Q(t−1). If the quality is the same or has improved at step 720, and the power is at or equal the previous power (the power is not being generally decreased over time), the power is increased (unless already at a maximum) at step 728, e.g., to attempt to improve quality. If power is generally being decreased (as evaluated at step 722), the power is further decreased (unless already at a minimum) at step 726.

If the quality measure has been lowered as evaluated at step 720, and the power is at or equal the previous power (the power is not being generally decreased over time) at step 724, the power is increased (unless already at the maximum), e.g., to attempt to improve quality. If power is generally being decreased (as evaluated at step 724), the power is further decreased (unless already at the minimum) at step 726, otherwise it is increase at step 728.

As can be seen, the logic of FIG. 7 generally attempts to maintain or improve quality to above a threshold quality value by controlling the power to a level that is sufficient for quality purposes, but does not waste power. Notwithstanding, because there may be changes in ambient illumination, if the power does not change based on the logic of steps 710 through 728, such as periodically (e.g., a delta of every five seconds), the power may be decreased to account for the possible changes in ambient illumination that will yield good performance with lower power. This is represented by steps 730 (power change in ΔT) and 732 (decrease if no change).

Note that although not explicitly shown, there may be some added hysteresis in the quality checks to prevent oscillations in power. Proportionality control may be used to speed up changes in power when the ambient illumination changes, although this may be done at the expense of stability.

In addition to or as part of the quality evaluation, other considerations may be used in controlling illumination power. For example, the battery state of a device may result in a change in what is considered acceptable quality, what is considered beneficial and/or what is considered "maximum" power. Lower powered lasers may be selected over those that consume more power in such a condition, even if quality decreases as a result. If two (or more) devices with illumination sources are present and able to communicate with one another, one having more battery power and/or more efficient lasers may be favored or weighted as to how much illumination each outputs over another device or devices.

As can be seen, a controller coupled to a projector set (comprising one or more projection elements) that projects a light pattern towards a scene is controlled based upon data corresponding to environmental conditions. The projector set may be controlled to selectively illuminate at least part of the scene based upon the data, which may be captured stereo image data, such as a quality measure of computed depth data. The quality measure/data may correspond to texture and/or variance data.

The controller may be configured to turn off and turn on at least one of the one or more projection elements and/or ramp power up and/or down, to at least one of the one or more projection elements. The projector set may comprise at least one infrared projection element and/or at least one visible light projection element. The controller may be configured to independently control each of at least two projection elements.

The controller may be configured to control illumination of at least one region of interest of the scene based upon one or more illumination parameters, in which the region of interest is less than the entire scene capable of being illuminated.

A method or the like for determining depth data based upon stereo images that are dependent at least in part upon illumination of a scene may be used, including obtaining quality data based upon stereo matching of images, and controllably projecting light into the scene based upon the quality data. The illuminating of the scene may be coordinated with the capture of the stereo images.

Obtaining the quality data may comprise illuminating at least part of the scene at a first illumination level at one time and capturing first stereo images during the illuminating with the first illumination level, illuminating the at least part of the scene at second, different illumination level at another time and capturing second stereo images during the illuminating with the second illumination level, processing at least part of the first stereo images into a first set of data, processing at least part of the second set of stereo images into a second set of data, and combining the first set of data and second set of data into combined quality data. The combined quality data may be used to independently control different regions of interest within the scene with independent illumination levels.

Obtaining the quality data may comprise illuminating at least part of the scene with visible light and capturing visible light stereo images during the illuminating with the visible light, illuminating the at least part of the scene with infrared light and capturing second stereo images during the illuminating with the infrared light, processing at least part of the visible light stereo images into a first set of data, processing at least part of the infrared stereo images into a second set of data, and combining the first set of data and second set of data. The combined quality data may be used to independently illuminate each of at least two different regions of interest within the scene with visible light or infrared light, or both visible light and infrared light.

One or more illumination parameters may be determined for a region of interest within a scene. Aspects may include reducing or turning off illumination power to the scene or part of the scene to determine whether illuminating the scene or the part of the scene is beneficial to depth data quality. Similarly, aspects may include increasing or turning on illumination power to the scene or part of the scene to determine whether illuminating the scene or the part of the scene is beneficial to depth data quality.

Other aspects may be directed towards illuminating a region of interest comprising a scene or part of a scene, and processing captured stereo image data to determine an intensity level for illuminating the region of interest.

Example Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 8:
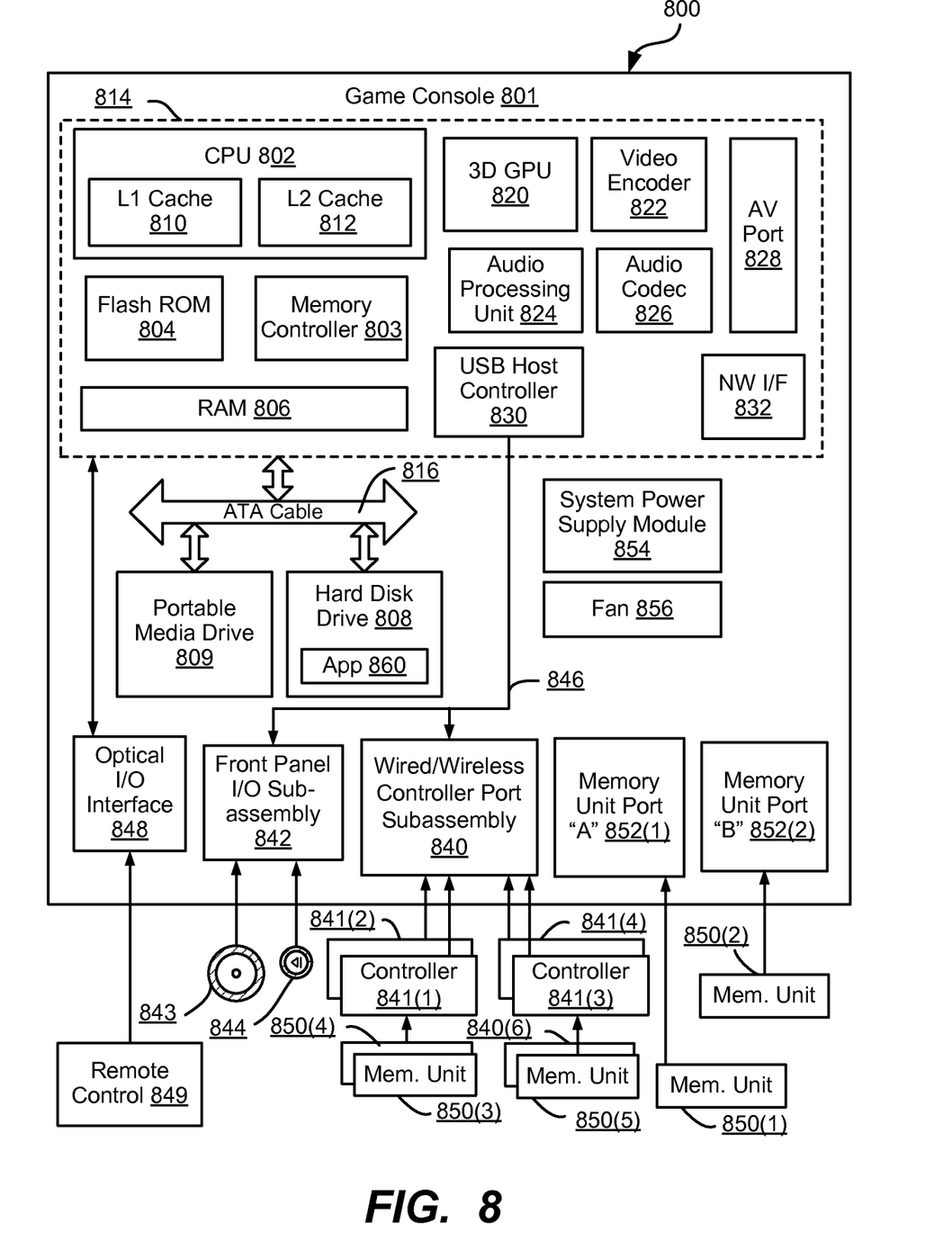
FIG. 8 is a block diagram representing an exemplary non-limiting computing system or operating environment, in the form of a gaming system, into which one or more aspects of various embodiments described herein can be implemented.

FIG. 8 is a functional block diagram of an example gaming and media system 800 and shows functional components in more detail. Console 801 has a central processing unit (CPU) 802, and a memory controller 803 that facilitates processor access to various types of memory, including a flash Read Only Memory (ROM) 804, a Random Access Memory (RAM) 806, a hard disk drive 808, and portable media drive 809. In one implementation, the CPU 802 includes a level 1 cache 810, and a level 2 cache 812 to temporarily store data and hence reduce the number of memory access cycles made to the hard drive, thereby improving processing speed and throughput.

The CPU 802, the memory controller 803, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 802, the memory controller 803, the ROM 804, and the RAM 806 are integrated onto a common module 814. In this implementation, the ROM 804 is configured as a flash ROM that is connected to the memory controller 803 via a Peripheral Component Interconnect (PCI) bus or the like and a ROM bus or the like (neither of which are shown). The RAM 806 may be configured as multiple Double Data Rate Synchronous Dynamic RAM (DDR SDRAM) modules that are independently controlled by the memory controller 803 via separate buses (not shown). The hard disk drive 808 and the portable media drive 809 are shown connected to the memory controller 803 via the PCI bus and an AT Attachment (ATA) bus 816. However, in other implementations, dedicated data bus structures of different types can also be applied in the alternative.

A three-dimensional graphics processing unit 820 and a video encoder 822 form a video processing pipeline for high speed and high resolution (e.g., High Definition) graphics processing. Data are carried from the graphics processing unit 820 to the video encoder 822 via a digital video bus (not shown). An audio processing unit 824 and an audio codec (coder/decoder) 826 form a corresponding audio processing pipeline for multi-channel audio processing of various digital audio formats. Audio data are carried between the audio processing unit 824 and the audio codec 826 via a communication link (not shown). The video and audio processing pipelines output data to an A/V (audio/video) port 828 for transmission to a television or other display/speakers. In the illustrated implementation, the video and audio processing components 820, 822, 824, 826 and 828 are mounted on the module 814.

FIG. 8 shows the module 814 including a USB host controller 830 and a network interface (NW I/F) 832, which may include wired and/or wireless components. The USB host controller 830 is shown in communication with the CPU 802 and the memory controller 803 via a bus (e.g., PCI bus) and serves as host for peripheral controllers 834. The network interface 832 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 8, the console 801 includes a controller support subassembly 840, for supporting four game controllers 841(1)-841(4). The controller support subassembly 840 includes any hardware and software components needed to support wired and/or wireless operation with an external control device, such as for example, a media and game controller. A front panel I/O subassembly 842 supports the multiple functionalities of a power button 843, an eject button 844, as well as any other buttons and any LEDs (light emitting diodes) or other indicators exposed on the outer surface of the console 801. The subassemblies 840 and 842 are in communication with the module 814 via one or more cable assemblies 846 or the like. In other implementations, the console 801 can include additional controller subassemblies. The illustrated implementation also shows an optical I/O interface 848 that is configured to send and receive signals (e.g., from a remote control 849) that can be communicated to the module 814.

Memory units (MUs) 850(1) and 850(2) are illustrated as being connectable to MU ports "A" 852(1) and "B" 852(2), respectively. Each MU 850 offers additional storage on which games, game parameters, and other data may be stored. In some implementations, the other data can include one or more of a digital game component, an executable gaming application, an instruction set for expanding a gaming application, and a media file. When inserted into the console 801, each MU 850 can be accessed by the memory controller 803.

A system power supply module 854 provides power to the components of the gaming system 800. A fan 856 cools the circuitry within the console 801.

An application 860 comprising machine instructions is typically stored on the hard disk drive 808. When the console 801 is powered on, various portions of the application 860 are loaded into the RAM 806, and/or the caches 810 and 812, for execution on the CPU 802. In general, the application 860 can include one or more program modules for performing various display functions, such as controlling dialog screens for presentation on a display (e.g., high definition monitor), controlling transactions based on user inputs and controlling data transmission and reception between the console 801 and externally connected devices.

The gaming system 800 may be operated as a standalone system by connecting the system to high definition monitor, a television, a video projector, or other display device. In this standalone mode, the gaming system 800 enables one or more players to play games, or enjoy digital media, e.g., by watching movies, or listening to music. However, with the integration of broadband connectivity made available through the network interface 832, gaming system 800 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
a projector set comprising one or more projection elements, the projector set configured to perform active illumination by projecting a light pattern towards a scene;
a controller coupled to the projector set, the controller configured to:
receive data corresponding to environmental conditions, the environmental conditions comprising an amount of texture captured in the scene without using the active illumination, the texture comprising variations of color intensities on surfaces within the scene without use of the active illumination;
determine the amount of texture in part of the scene is above a threshold; and
based on the determination that the amount of texture in the part of the scene is above the threshold, control the projector set to reduce a power of the active illumination when projecting the light pattern towards the part of the scene.

2. The system of claim 1 wherein wherein the controller is further configured to:
determine a current quality measurement in the part of the scene;
determine the current quality measurement exceeds a quality threshold is improved over a previous quality measure; and
based on determining that the previous quality measure also exceeds the quality threshold, maintain the reduced power of the active illumination.

3. The system of claim 2 wherein the data corresponding to the environmental conditions further comprises quality data, and the system further comprising an image processing component configured to process the at least part of the stereo images to obtain a quality measure as the data corresponding to the environmental conditions.

4. The system of claim 3 wherein the image processing component generates a depth map from at least part of the stereo images by combining different parts of the stereo image data based upon the quality measure.

5. The system of claim 1 wherein the controller is configured to:
turn off and turn on at least one of the one or more projection elements;
compare the amount of texture in the scene when the one or more projection elements is turned off and when the one or more projection elements is turned on; and
based on the comparing, determine whether to keep the projection elements turned off or turned on.

6. The system of claim 1 wherein the controller is configured to ramp power up or ramp power down to at least one of the one or more projection elements based on the amount of texture in the scene.

7. The system of claim 1 wherein the amount of texture captured in the scene without using the active illumination is determined by applying morphological filters or a median filter such that a contribution of the active illumination is removed from an image.

8. The system of claim 1 wherein the controller is configured to control illumination of at least one region of interest of the scene based upon one or more illumination parameters, in which the region of interest is less than an entirety of the scene capable of being illuminated.

9. The system of claim 1 wherein determining the amount of texture in part of the scene is above the threshold comprises determining the amount of the texture on objects in the scene is above the threshold.

10. A method comprising:
receiving data corresponding to environmental conditions, the environmental conditions comprising an amount of texture captured in the scene without using active illumination by projecting a light pattern towards a scene, the texture comprising-variations of color intensities on surfaces within the scene without use of the active illumination;
determining the amount of texture in part of the scene is above a threshold; and
based on the determination that the amount of texture in the part of the scene is above the threshold, reducing a power of the active illumination when projecting the light pattern towards the part of the scene.

11. The method of claim 10, further comprising:
obtaining quality data based upon stereo matching using one or more images; and
projecting active illumination into the scene based upon the quality data of the stereo matching being below a quality threshold.

12. The method of claim 11 wherein obtaining the quality data comprises;
illuminating at least part of the scene at a first illumination level at one time;
capturing first stereo images during the illuminating with the first illumination level;
illuminating the at least part of the scene at a second, different illumination level at another time;
capturing second stereo images during the illuminating with the second illumination level;
processing at least part of the first stereo images into a first set of data;
processing at least part of the second set of stereo images into a second set of data; and
combining the first set of data and second set of data into combined quality data.

13. The method of claim 12 further comprising using the combined quality data to independently control different regions of interest within the scene with independent illumination levels.

14. The method of claim 11 wherein obtaining the quality data comprises;
illuminating at least part of the scene with visible light;
capturing visible light stereo images during the illuminating with the visible light;
illuminating the at least part of the scene with infrared light;
capturing second stereo images during the illuminating with the infrared light;
processing at least part of the visible light stereo images into a first set of data;
processing at least part of the infrared stereo images into a second set of data; and
combining the first set of data and second set of data.

15. The method of claim 14 further comprising using the combined quality data to independently illuminate at least two different regions of interest within the scene with one or more of the following: visible light and infrared light.

16. The method of claim 11 further comprising determining one or more illumination parameters for a region of interest within the scene.

17. The method of claim 11 further comprising reducing or turning off illumination power to part of the scene to determine whether illuminating the part of the scene is beneficial to depth data quality.

18. The method of claim 11 further comprising increasing or turning on illumination power to part of the scene to determine whether illuminating the part of the scene is beneficial to depth data quality.

19. The method of claim 11 further comprising coordinating the illuminating of the scene with the capture of the one or more images.

20. One or more machine or computer-readable storage devices containing executable instructions, which when executed perform operations comprising:
illuminating a scene without using active illumination; and
upon illuminating the scene, processing stereo image data to determine an intensity level for illuminating the scene with the active illumination, the intensity level for illuminating the scene with the active illumination being based on an amount of texture in the scene, the texture comprising variations of color intensities on surfaces within the scene without use of the active illumination.

* * * * *